July 5, 1966 G. J. GERMANN 3,259,737
ANTI-GLARE DEVICE FOR AUTOMOTIVE HEADLIGHTS
Filed Dec. 26, 1963

INVENTOR.
GEORGE J. GERMANN
BY
Merchant, Merchant & Gould
ATTORNEYS

United States Patent Office 3,259,737
Patented July 5, 1966

3,259,737
ANTI-GLARE DEVICE FOR AUTOMOTIVE
HEADLIGHTS
George J. Germann, P.O. Box 375, New Ulm, Minn.
Filed Dec. 26, 1963, Ser. No. 333,559
6 Claims. (Cl. 240—46.57)

This invention relates generally to headlights for automotive vehicles, and more particularly it relates to a novel filter device for reducing the glare produced by automotive headlights.

The present invention generally comprises a color transparent filter which includes a plurality of filter sections of at least two different colors and with each section of a single color. The colored filter sections are of a size to produce novel functional characteristics and are also arranged with respect to one another in a novel manner disclosed particularly hereinafter.

It is known that the glare produced by automotive headlights in the eyes of oncoming motorists is caused by excessive contrast between the bright light of the headlights and the surrounding blackness of the night. This glare from automotive headlights has been a long known problem, and the optimum condition is the provision of sufficient illumination of the vehicle's pathway for safe and efficient driving without providing a contrasting brightness so excessive as to cause undesirable glare to oncoming drivers.

With the above in mind, an important object of the present invention is the provision of a color transparent filter arrangement for automotive headlights which comprises a plurality of colored filter sections so designed and arranged with respect to one another as to be invisible as a separate color section to an approaching driver who is at a distance of at least approximately 50 feet away from the filtered headlight with the colored filter sections blending together to produce a generally glare-free and white or near white illumination at or beyond said distance.

Another object of the present invention is the provision of a light filter for automotive headlights in which the colored filter sections thereof are arranged so that differently colored sections are adjacent to one another.

A further object of the present invention is the provision of a light filter for automotive headlights which covers the greater portion of the area of the headlight lens but also permits a smaller portion of light to be thrown upon the immediate roadway in front of the vehicle so as to provide background relief to the oncoming driver and thereby reduce the contrast of the headlights with the darkness of the night.

Still further objects and advantages of the present invention reside in the provision of a color transparent filter arrangement for automotive headlights which may be economically manufactured and conveniently attached to or provided as a part of the headlight lens.

Other objects and advantages of the present invention will become apparent from a consideration of the following detailed specification, appended claims, and attached drawings.

Referring to the drawings, wherein like reference characters indicate like parts or elements throughout the several views.

Figure 1:
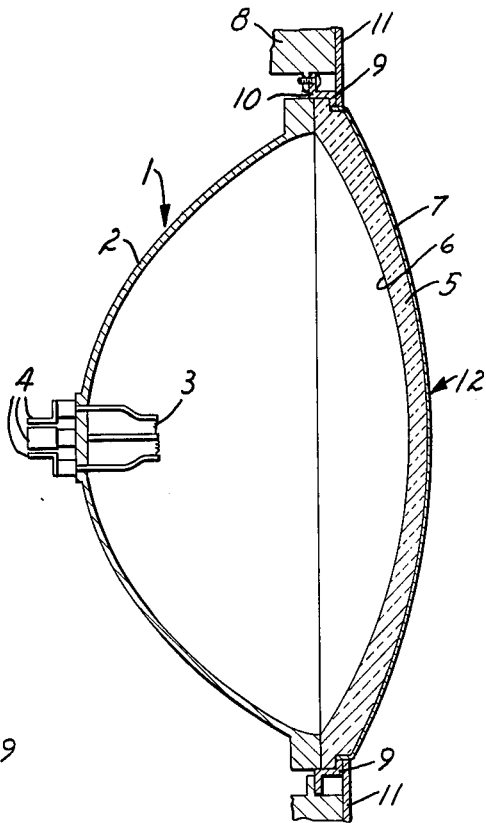
FIG. 1 is a view in section of an auomotive headlight having a colored filter affixed to the lens thereof.

Referring to the drawings, and particularly FIG. 1 thereof, an automotive headlight lamp is shown therein, the same being represented generally by the reference numeral 1. The headlight or lamp 1 comprises a parabolic reflector 2 with a filament 3 secured therein and provided with terminals 4, according to the usual practice. The headlight 1 further comprises a lens 5 having an inner surface 6 and an outer surface 7. As illustrated in FIG. 1, the headlight 1 is suitably secured in the automotive body 8 by means of an annular rim 9 having radially outwardly projecting ears 10. Also, an annular trim flange 11 is illustrated in FIG. 1.

In accordance with the present invention, a color transparent glare-reducing filter, represented generally by the reference numeral 12, is carried by the headlight lens 5, as shown in FIG. 1. The filter 12 shown in FIG. 1 is suitably secured to the outer surface 7 of the lens 5, but it will be understood that the filter 12 could also be optionally positioned on the inner surface 6 of the lens 5 or with the various colors of the filter formed into the lens 5 itself.

It will be understood that the filter 12 comprises a plurality of filter sections of at least two different colors and with each section being of a single color. Further, the colored filter sections are arranged so that differently colored sections are disposed adjacent to one another. In the embodiment illustrated in FIG. 2 of the drawings, the filter sections 13 are generally triangular in shape and are arranged in a generally symmetric pattern about a center 14 and are further arranged so that differently colored sections are adjacent to one another. As shown therein, red sections 15 are alternated with green sections 16 in the central area; whereas yellow sections 17, green sections 16, red sections 15, and blue sections 18 are alternated with one another in the outer area of the specific filter embodiment shown in FIG. 2. It is noted that the filter sections 15–18 shown in FIG. 2 may be separated from one another by opaque lines. Also, the filter sections may be suitably separated from one another by transluscent or transparent lines, not shown, or they may simply abut one another without any separation at all.

Figure 2:
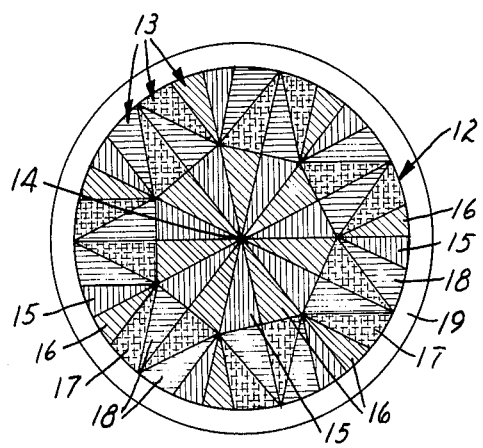
FIG. 2 is a view in elevation of an automotive headlight lens having a colored filter attached thereto and illustrative of one embodiment of the present invention.

In the embodiment shown in FIG. 2, the filter, represented generally by the reference numeral 12, is of a diameter smaller than the diameter of the lens 5 so as to provide an annular transluscent or transparent band 19 to light the immediate road area generally in front of the headlight with subdued, or lower intensity, light so as to provide a background relief for the oncoming driver, in addition to dulling the illumination of the headlight gradually at the edge.

Figure 3:
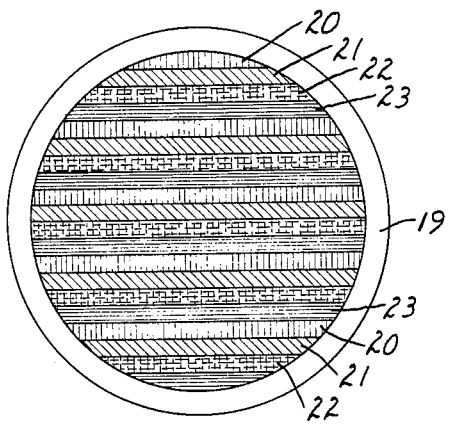
FIG. 3 is a view similar to FIG. 2 but showing a different filter pattern and arrangement.

Another illustrative embodiment of the present invention is shown in FIG. 3 wherein the filter sections are in the form of elongated bars arranged in a generally parallel relationship with respect to one another, and red sections 20, green sections 21, yellow sections 22, and blue sections 23 are alternated with one another, as specifically shown therein. Also, in this illustrative embodiment of the present invention, an annular band 19 is also provided for the purpose noted above.

It should be noted that the embodiments shown in FIGS. 2 and 3 of the present invention are illustrative of the patterns or arrangements of filter sections which may be employed in the practice of the present invention, and it is particularly noted that the shape of the filter sections may be varied. Also, with respect to the colors of the filter sections of the present invention, the primary colors of red, green, yellow, and blue have been noted above, but this invention is not limited to such an arrangement. It is significant that at least two colors of filter sections must be provided and the arrangement so designed that no two filter sections of the same color are immediately adjacent one to another.

Figure 4:
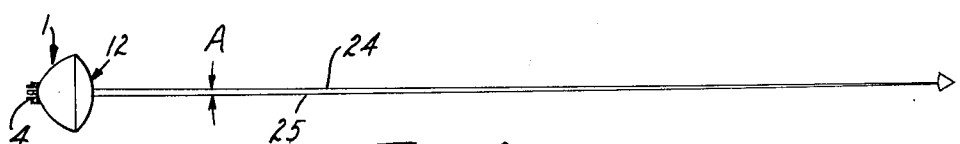
FIG. 4 is a diagrammatic view illustrating one feature of the present invention.

With respect to the size of the filter sections of the present invention, the same do not have to be of equal area or size; but the optimum size is dictated by the desire to break up the light beams into various filtered sections or segments so that the light passing through the various color sections will blend together to produce a generally glare-free and white or near white illumination at or beyond a distance of approximately 50 feet from the headlight. This feature of the present invention is illustrated in FIG. 4 of the drawings, wherein a headlight 1 is shown as having a lens of a plurality of filter sections of different colors. Lines 24 and 25 have been drawn from the opposite sides of a selected filter section to the eye of an approaching motorist. The filter section must be small enough in size so that the angle A between the lines 24 and 25 will subtend not more than a one minute angle at approximately 50 feet from the headlight 1 or beyond. A one minute angle is the normal limit of visual definition ascertainable by the average person; therefore, at 50 feet (for example) and beyond the color of each filter section of the lens 5 will not be ascertainable to the driver but an overall blend of near white and glare-free illumination will be provided.

It should be understood that the example of approximately 50 feet given above is for purposes of illustration only, it being noted that an approaching driver is normally bothered by glare only up to a distance of approximately 50 feet from the other vehicle since at a closer distance he normally passes out the main beam of the headlight and into the fringe light area.

With respect to light intensity, the filter of the present invention definitely will reduce the intensity or amount of light passing through the lens 5 of the headlight 1. Therefore, the total lens area may be increased, such as by providing additional headlights also having filters provided in accordance with the present invention, or by increasing the size of the headlight area, it being noted that the optimum condition is to provide sufficient illumination for safe and efficient driving without glare.

It is further noted that the filter 12 provided in accordance with the present invention may be suitably formed from any clear transparent material containing the desired colors, such as glass, plastic, or the like.

My invention has been thoroughly tested and found to be completely satisfactory for the accomplishment of the above-noted objects; and while preferred embodiments thereof in which the principles of the present invention have been incorporated have been shown and described above, it should be specifically understood that the same may be modified without departure from the scope and spirit of the appended claims.

What is claimed is:
1. In an automotive headlight having a lens:
   (a) a color transparent glare-reducing filter covering the greater portion of the area of the lens of said headlight, said filter comprising:
      (1) a plurality of filter sections of at least two different colors and with each section being of a single color,
      (2) said colored filter sections being arranged so that differently colored sections are adjacent to one another,
   (b) said filter being carried by the lens of said headlight,
   (c) each of said filter sections being small enough in size whereby rays from said light extending from opposite sides of each such filter section at the greatest dimension thereof subtends not more than a one minute angle at a distance at least approximately 50 feet away from the headlight, and
   (d) said color sections blending together to produce a generally glare-free and white or near white illumination at or beyond said distance.

2. The structure defined in claim 1 in which said filter sections are generally triangular in shape and are arranged in a generally symmetric pattern about a center.

3. The structure defined in claim 1 in which said filter sections comprise elongated bars arranged in a generally parallel relationship with respect to one another.

4. The structure defined in claim 1 in which said filter is circular and of smaller diameter than the headlight lens so as to provide an annular unfiltered lens band around said filter.

5. In an automotive headlight having a lens:
   (a) a color transparent and glare reducing filter carried by the lens of said headlight, said filter comprising:
      (1) a plurality of filter sections of at least two different colors and with each section being of a single color,
      (2) said colored filter sections being arranged so that differently colored sections are adjacent to one another,
   (b) said filter being circular and of smaller diameter than said headlight lens whereby to provide an annular unfiltered band of lens around said filter, and
   (c) said filter sections of the filter being separated by translucent bars.

6. In an automotive headlight having a lens:
   (a) a color transparent and glare reducing filter carried by the lens of said headlight, said filter comprising:
      (1) a plurality of filter sections of at least two different colors and with each section being of a single color,
      (2) said colored filter sections being arranged so that differently colored sections are adjacent to one another,
   (b) said filter being circular and of smaller diameter than said headlight lens whereby to provide an annular unfiltered band of lens around said filter, and
   (c) said filter sections being each small enough in size whereby rays from said light extending from opposite sides of each such filter section at the greatest dimension thereof subtends not more than a one minute angle at a distance of at least approximately 50 feet away from the headlight.

References Cited by the Examiner

UNITED STATES PATENTS

| | | | |
|---|---|---|---|
| 1,210,039 | 12/1916 | Brennecke | 240—46.57 |
| 1,379,556 | 5/1921 | Gorman | 240—46.59 |
| 2,051,327 | 8/1936 | Chalfant | 240—46.59 X |
| 2,721,256 | 10/1955 | Duhon | 240—46.59 X |

NORTON ANSHER, *Primary Examiner.*

CHARLES R. RHODES, *Assistant Examiner.*